US012645949B2

(12) United States Patent
Pushak et al.

(10) Patent No.: US 12,645,949 B2

(45) Date of Patent: Jun. 2, 2026

(54) CHROMOSOME REPRESENTATION LEARNING IN EVOLUTIONARY OPTIMIZATION TO EXPLOIT THE STRUCTURE OF ALGORITHM CONFIGURATION

(71) Applicant: Oracle International Corporation, Redwood Shores, CA (US)

(72) Inventors: Yasha Pushak, Vancounver (CA); Moein Owhadi Kareshk, Burnaby (CA); Hesam Fathi Moghadam, Sunnyvale, CA (US); Sungpack Hong, Palo Alto, CA (US); Hassan Chafi, San Mateo, CA (US)

(73) Assignee: Oracle international Corporation, Redwood Shores, CA (US)

( * ) Notice: Subject to any disclaimer, the term of this patent is extended or adjusted under 35 U.S.C. 154(b) by 946 days.

(21) Appl. No.: 17/900,779

(22) Filed: Aug. 31, 2022

(65) Prior Publication Data

US 2024/0070471 A1    Feb. 29, 2024

(51) Int. Cl.
*G06N 3/086*        (2023.01)
*G06N 3/126*        (2023.01)

(52) U.S. Cl.
CPC .................................... *G06N 3/126* (2013.01)

(58) Field of Classification Search
CPC ..................................................... G06N 3/126
See application file for complete search history.

(56) References Cited

U.S. PATENT DOCUMENTS 10,489,713 B1 *  11/2019  Ernest ...................... G06N 3/02
2002/0059154 A1   5/2002  Rodvold
(Continued)

OTHER PUBLICATIONS

Reif et al., "Meta-learning for Evolutionary Parameter Optimization of Classifiers", Machine Learning, DOI: 10.1007/s10994-012-5286-7, dated Apr. 2012, 24 pages.
(Continued)

*Primary Examiner* — Brandon S Cole

(74) *Attorney, Agent, or Firm* — Hickman Becker Bingham Ledesma LLP

(57)        ABSTRACT
Principal component analysis (PCA) accelerates and increases accuracy of genetic algorithms. In an embodiment, a computer generates many original chromosomes. Each original chromosome contains a sequence of original values. Each position in the sequences in the original chromosomes corresponds to only one respective distinct parameter in a set of parameters to be optimized. Based on the original chromosomes, many virtual chromosomes are generated. Each virtual chromosome contains a sequence of numeric values. Positions in the sequences in the virtual chromosomes do not correspond to only one respective distinct parameter in the set of parameters to be optimized. Based on the virtual chromosomes, many new chromosomes are generated. Each new chromosome contains a sequence of values. Each position in the sequences in the new chromosomes corresponds to only one respective distinct parameter in the set of parameters to be optimized. The computer may be configured based on a best new chromosome.

19 Claims, 5 Drawing Sheets

COMPUTER 100

| ORIGINAL CHROMOSOMES 121 | | | | |
|---|---|---|---|---|
| FITNESS SCORE | CHROMOSOME | POSITION 1 | POSITION 2 | POSITION 3 |
| 0.3 | OC1 | VALUE A1 | VALUE B1 | VALUE C1 |
| 0.7 | OC2 | VALUE A2 | VALUE B2 | VALUE C2 |
| 0.1 | OC3 | VALUE A3 | VALUE B3 | VALUE C3 |
| 0.4 | OC4 | VALUE A4 | VALUE B4 | VALUE C4 |
| 0.3 | OC5 | VALUE A5 | VALUE B5 | VALUE C5 |
| | | PARAMETER A | PARAMETER B | PARAMETER C |
| | | MACHINE LEARNING MODEL 110 | | |

| VIRTUAL CHROMOSOMES 122 | | | | | |
|---|---|---|---|---|---|
| GENETIC OPERATOR | ORIGINAL CHROMOSOME(S) | CHROMOSOME | PRINCIPAL COMPONENT D POSITION 1 | PRINCIPAL COMPONENT E POSITION 2 | PRINCIPAL COMPONENT F POSITION 3 |
| ELITISM | OC2 | VC1 | VALUE D1 | VALUE E1 | VALUE F1 |
| | OC4 | VC2 | VALUE D2 | VALUE E2 | VALUE F2 |
| MUTATION | OC3 | VC3 | VALUE D3 | VALUE E3 | VALUE F3 |
| CROSSOVER | OC1 & OC4 | VC4 | VALUE D4 | VALUE E4 | VALUE F4 |
| | | VC5 | VALUE D5 | VALUE E5 | VALUE F5 |

(56) References Cited

U.S. PATENT DOCUMENTS

| 2004/0044633 | A1* | 3/2004 | Chen | G06N 3/086 |
| | | | | 706/21 |
| 2005/0021238 | A1* | 1/2005 | McGuffin | G06N 3/126 |
| | | | | 702/20 |
| 2011/0229888 | A1* | 9/2011 | Hengen | C12Q 1/6834 |
| | | | | 536/23.1 |
| 2013/0073490 | A1* | 3/2013 | Baughman | G06N 3/126 |
| | | | | 706/13 |
| 2020/0004804 | A1* | 1/2020 | Srinivasan | G06F 40/186 |
| 2024/0070471 | A1* | 2/2024 | Pushak | G06N 3/126 |

OTHER PUBLICATIONS

Maher et al., "SmartML: A Meta Learning-Based Framework for Automated Selection and Hyperparameter Tuning for Machine Learning Algorithms", Proceedings of the 22nd International Conference on Extending Database Technology (EDBT), (Mar. 2019).

Feurer et al., "Chapter 6 Auto-sklearn: Efficient and Robust Automated Machine Learning", Automated Machine Learning Methods, Systems and Challenges (excerpt), (Year: 2019).

Li et al., "A System for Massively Parallel Hyperparameter Tuning", In Proceedings of Machine Learning and Systems 2, 2020, 17 pages.

Ansótegui et al., "A Gender-Based Genetic Algorithm for the Automatic Configuration of Algorithms", In Proceedings of the International Conference on Principles and Practice of Constraint Programming, Sep. 2009, 16 pages.

Ansótegui et al., "Model-Based Genetic Algorithms for Algorithm Configuration", In Proceedings of the Twenty-Fourth International Joint Conference on Artificial Intelligence, Jun. 2015, 7 pages.

Ansótegui et al., "PyDGGA: Distributed GGA for Automatic Configuration", In Proceedings of the International Conference on Theory and Applications of Satisfiability Testing, Jul. 2021, 20 pages.

Bergstra et al., "Algorithms for Hyper-Parameter Optimization", Advances in Neural Information Processing Systems 24, 2011, 9 pages.

Bergstra et al., "Random Search for Hyper-Parameter Optimization", Journal of Machine Learning Research, vol. 13, No. 2, 2012, 25 pages.

Blot et al., "MO-ParamILS: A Multi-objective Automatic Algorithm Configuration Framework", In Proceedings of the International Conference on Learning and Intelligent Optimization, 2016, 16 pages.

D'Orsi et al., "Sparse PCA: Algorithms, Adversarial Perturbations and Certificates", In Proceedings of the 2020 IEEE 61st Annual Symposium on Foundations of Computer Science (FOCS), 2020, 12 pages.

Deb et al., "A Fast and Elitist Multiobjective Genetic Algorithm: NSGA-II", IEEE Transactions on Evolutionary Computation, vol. 6, No. 2, 2002, 16 pages.

Falkner et al., "BOHB: Robust and Efficient Hyperparameter Optimization at Scale", In Proceedings of the International Conference on Machine Learning, Jul. 2018, 19 pages.

"Optimize Your Optimization", Optuna, available: https://optuna.org/, retrieved Oct. 27, 2021, 4 pages.

Jamieson et al., "Non-stochastic Best Arm Identification and Hyperparameter Optimization", In Artificial Intelligence and Statistics, 2015, 13 pages.

Wold et al., "Principal Component Analysis", Chemometrics and Intelligent Laboratory Systems 2, 1987, 16 pages.

Li et al., "Hyperband: A Novel Bandit-Based Approach to Hyperparameter Optimization", The Journal of Machine Learning Research, 18(1), 2018, 52 pages.

Olson et al., "Automating biomedical data science through tree-based pipeline optimization", In Proceedings of the European Conference on the Applications of Evolutionary Computation, 2016, 16 pages.

Olson et al., "Evaluation of a Tree-based Pipeline Optimization Tool for Automating Data Science", In Proceedings of the Genetic and Evolutionary Computation Conference, Jul. 2016, 8 pages.

Olson et al., "TPOT: A Tree-based Pipeline Optimization Tool for Automating Machine Learning", In Proceedings of the Workshop on Automatic Machine Learning, Dec. 2016, 9 pages.

Ozaki et al., "Multiobjective Tree-structured Parzen Estimator for Computationally Expensive Optimization Problems", In Proceedings of the Genetic and Evolutionary Computation Conference, Jun. 2020, 9 pages.

Pushak et al., "Algorithm Configuration Landscapes", In Proceedings of the International Conference on Parallel Problem Solving from Nature, 2018, 12 pages.

Pushak et al., "AutoML Loss Landscapes", Aug. 2022, 29 pages.

Pushak et al., "Golden parameter search: exploiting structure to quickly configure parameters in parallel", In Proceedings of the Genetic and Evolutionary Computation Conference, Jun. 2020, 9 pages.

Pushak, "Algorithm Configuration Landscapes: Analysis & Exploitation", Doctoral Dissertation, University of British Columbia, 2022, 228 pages.

Hutter et al., "Sequential Model-Based Optimization for General Algorithm Configuration", In Proceedings of the International Conference on Learning and Intelligent Optimization, Jan. 2011, 15 pages.

* cited by examiner

FIG. 1

COMPUTER 100

ORIGINAL CHROMOSOMES 121

| FITNESS SCORE | CHROMOSOME | POSITION 1 | POSITION 2 | POSITION 3 |
|---|---|---|---|---|
| 0.3 | OC1 | VALUE A1 | VALUE B1 | VALUE C1 |
| 0.7 | OC2 | VALUE A2 | VALUE B2 | VALUE C2 |
| 0.1 | OC3 | VALUE A3 | VALUE B3 | VALUE C3 |
| 0.4 | OC4 | VALUE A4 | VALUE B4 | VALUE C4 |
| 0.3 | OC5 | VALUE A5 | VALUE B5 | VALUE C5 |
|  |  | PARAMETER A | PARAMETER B | PARAMETER C |

MACHINE LEARNING MODEL 110

VIRTUAL CHROMOSOMES 122

| GENETIC OPERATOR | ORIGINAL CHROMOSOME(S) | CHROMOSOME | PRINCIPAL COMPONENT D POSITION 1 | PRINCIPAL COMPONENT E POSITION 2 | PRINCIPAL COMPONENT F POSITION 3 |
|---|---|---|---|---|---|
| ELITISM | OC2 | VC1 | VALUE D1 | VALUE E1 | VALUE F1 |
| ELITISM | OC4 | VC2 | VALUE D2 | VALUE E2 | VALUE F2 |
| MUTATION | OC3 | VC3 | VALUE D3 | VALUE E3 | VALUE F3 |
| CROSSOVER | OC1 & OC4 | VC4 | VALUE D4 | VALUE E4 | VALUE F4 |
|  |  | VC5 | VALUE D5 | VALUE E5 | VALUE F5 |

FIG. 2

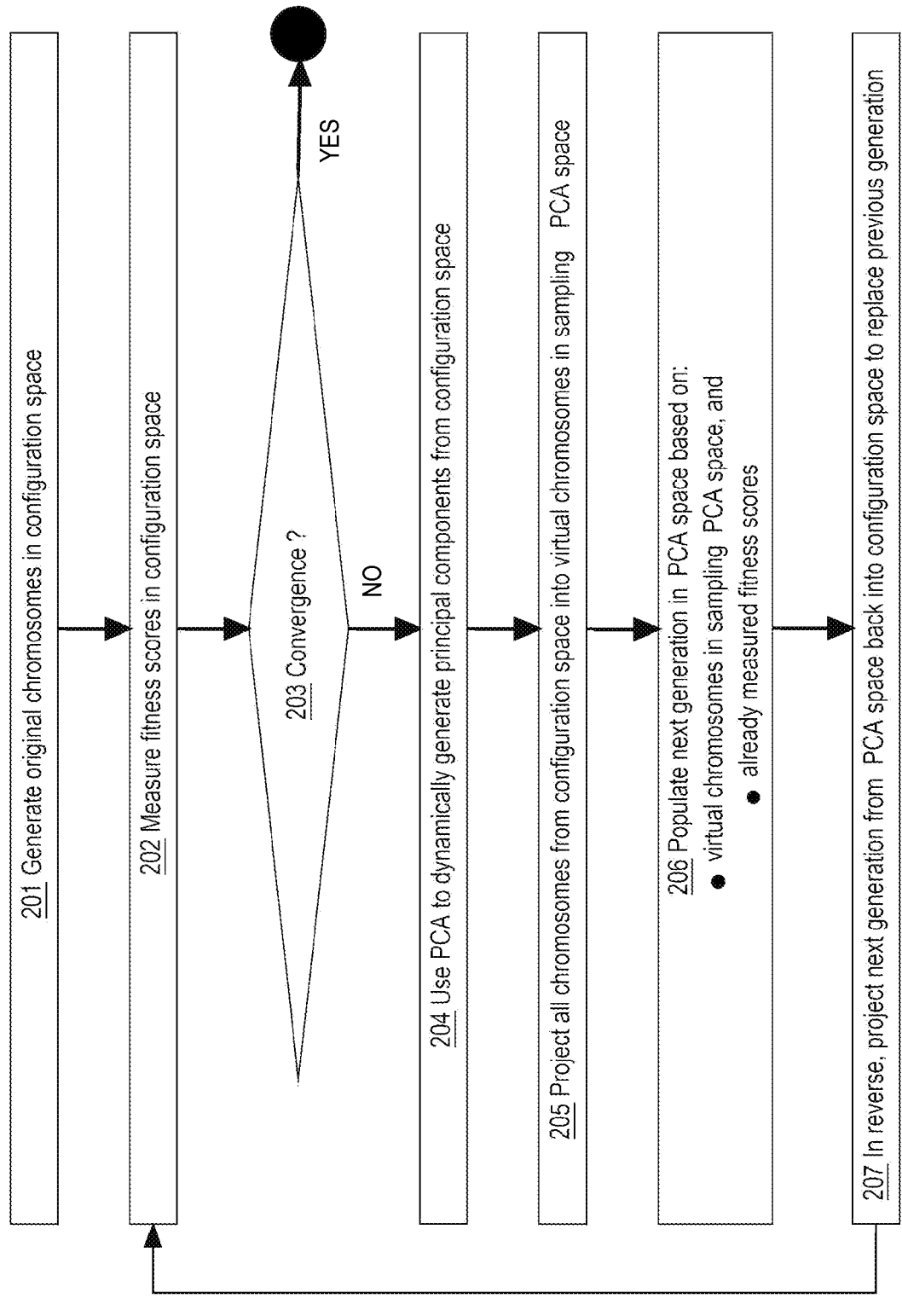

201 Generate original chromosomes in configuration space

202 Measure fitness scores in configuration space

203 Convergence ?

YES

NO

204 Use PCA to dynamically generate principal components from configuration space 205 Project all chromosomes from configuration space into virtual chromosomes in sampling PCA space 206 Populate next generation in PCA space based on:
• virtual chromosomes in sampling PCA space, and
• already measured fitness scores 207 In reverse, project next generation from PCA space back into configuration space to replace previous generation

FIG. 3

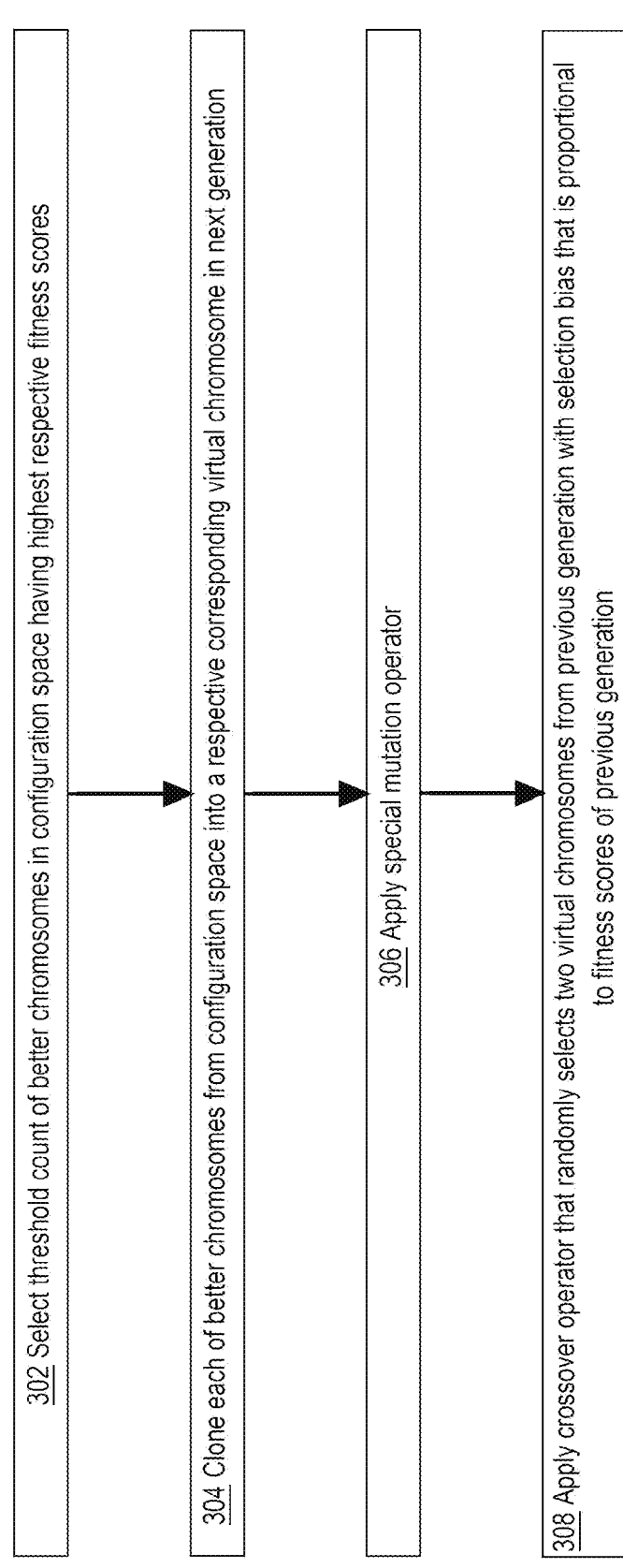

302 Select threshold count of better chromosomes in configuration space having highest respective fitness scores 304 Clone each of better chromosomes from configuration space into a respective corresponding virtual chromosome in next generation 306 Apply special mutation operator 308 Apply crossover operator that randomly selects two virtual chromosomes from previous generation with selection bias that is proportional to fitness scores of previous generation

SOFTWARE SYSTEM 500

502

502N  APPLICATION PROGRAM N

[...]

502C  APPLICATION PROGRAM 3

502B  APPLICATION PROGRAM 2

502A  APPLICATION PROGRAM 1

OPERATING SYSTEM
(e.g., WINDOWS, UNIX, LINUX, MAC OS, IOS, ANDROID, OR LIKE)

510

GRAPHICAL USER INTERFACE (GUI)  515

VIRTUAL MACHINE MONITOR (VMM)

530

BARE HARDWARE (e.g., COMPUTING DEVICE 400)

CHROMOSOME REPRESENTATION LEARNING IN EVOLUTIONARY OPTIMIZATION TO EXPLOIT THE STRUCTURE OF ALGORITHM CONFIGURATION

FIELD OF THE INVENTION

The present invention relates to hyperparameter optimization for machine learning. Herein principal component analysis (PCA) accelerates and increases accuracy of genetic algorithms.

BACKGROUND

Computer scientists write algorithms to solve complex problems. Such a problem may be defined as a set of steps that can be repeated until a solution to the problem is found. The creators of these algorithms are faced with several design decisions that influence the performance of the algorithms. To maintain flexibility for reusability, these design decisions are typically deferred and converted into algorithm parameters that can be adjusted to configure the behavior of the algorithm. For example, the training algorithm for the well-known random forest machine learning classifier needs a count of how many decision trees should be trained within the forest, as well as a uniform depth of the trees.

Manually finding suitable (e.g. well tuned or merely tractable) values for all of these parameters can be tedious and time consuming because the configuration space is typically high-dimensional, may be prone to destabilizing discontinuities in any dimension, and may contain constraints between the parameters. It is well known that different problem instances or distributions of problem instances require different parameter configurations for a same reconfigurable algorithm to obtain satisfactory performance in terms of result characteristics such as accuracy or in terms of computer resource consumption such as time and space. An optimizer is a class of algorithms to automatically find high-quality values for parameters of original algorithms. That is, the optimizer is a meta-algorithm that analyzes the performance of a target algorithm. The optimizer and target algorithm each has its own problem space and solution space.

Algorithm configuration procedures automate the tedious task of finding high-quality values for an algorithm's parameters. These parameters control the performance of an algorithm for a given problem instance (or input), but do not affect correctness. Automated algorithm configuration procedures have recently gained substantial attention due to their applicability in a variety of applications. One example optimization problem entails maximizing the predictive accuracy of an automated machine learning (AutoML) pipeline by tuning the hyperparameters for configuring and training a machine learning algorithm. Another example optimization problem entails minimizing the running time required by a solver algorithm to solve industrially-relevant nondeterministic polynomial (NP)-hard problems.

Examples of commercially valuable NP-hard problems include graph partitioning, Boolean satisfiability (SAT), the traveling salesperson problem (TSP), and mixed integer programing (MIP). The most popular configuration procedures for these problems are based on strong diversification mechanisms, thereby ensuring that the entire parameter configuration space is adequately explored. The trade-off between exploring and fine-tuning the configuration space is a challenging problem. Meta-heuristic algorithms are known to be effective for optimization problems without closed-form solutions.

The following are two complimentary mechanisms that may be crucial to a state-of-the-art configurator (i.e. configuration optimizer).

the search procedure: the optimization algorithm used to explore the parameter configuration space; and the pruning mechanism: the strategy (e.g. heuristics) used to determine how much computer resources (e.g. time) needs to be spent evaluating a poorly performing configuration before it can be eliminated from consideration.

While both may be required to obtain state-of-the-art performance, innovative techniques herein improve the search procedure. State of the art search typically cannot leverage correlations between parameters. For example, cake baking parameters may include oven temperature and baking duration that are compensatory such that more temperature may compensate for less time or vice versa.

State of the art search typically only optimizes for one objective, such as inference accuracy or training time, but not both. Those objectives may be antagonistic to each other such that improved training time degrades accuracy or vice versa. Dynamics such as compensatory parameters, multiple objectives, and antagonistic objectives (i.e. trade-offs) are not well suited to state of the art search procedures.

BRIEF DESCRIPTION OF THE DRAWINGS

In the drawings:

FIG. 1 is a block diagram that depicts an example computer that optimizes configuration parameters of any control system, such as a machine learning (ML) model;

FIG. 2 is a flow diagram that depicts an example genetic algorithm that a computer may accelerate using principal component analysis (PCA);

FIG. 3 is a flow diagram that depicts example special activities for a genetic algorithm;

DETAILED DESCRIPTION

Figure 4:
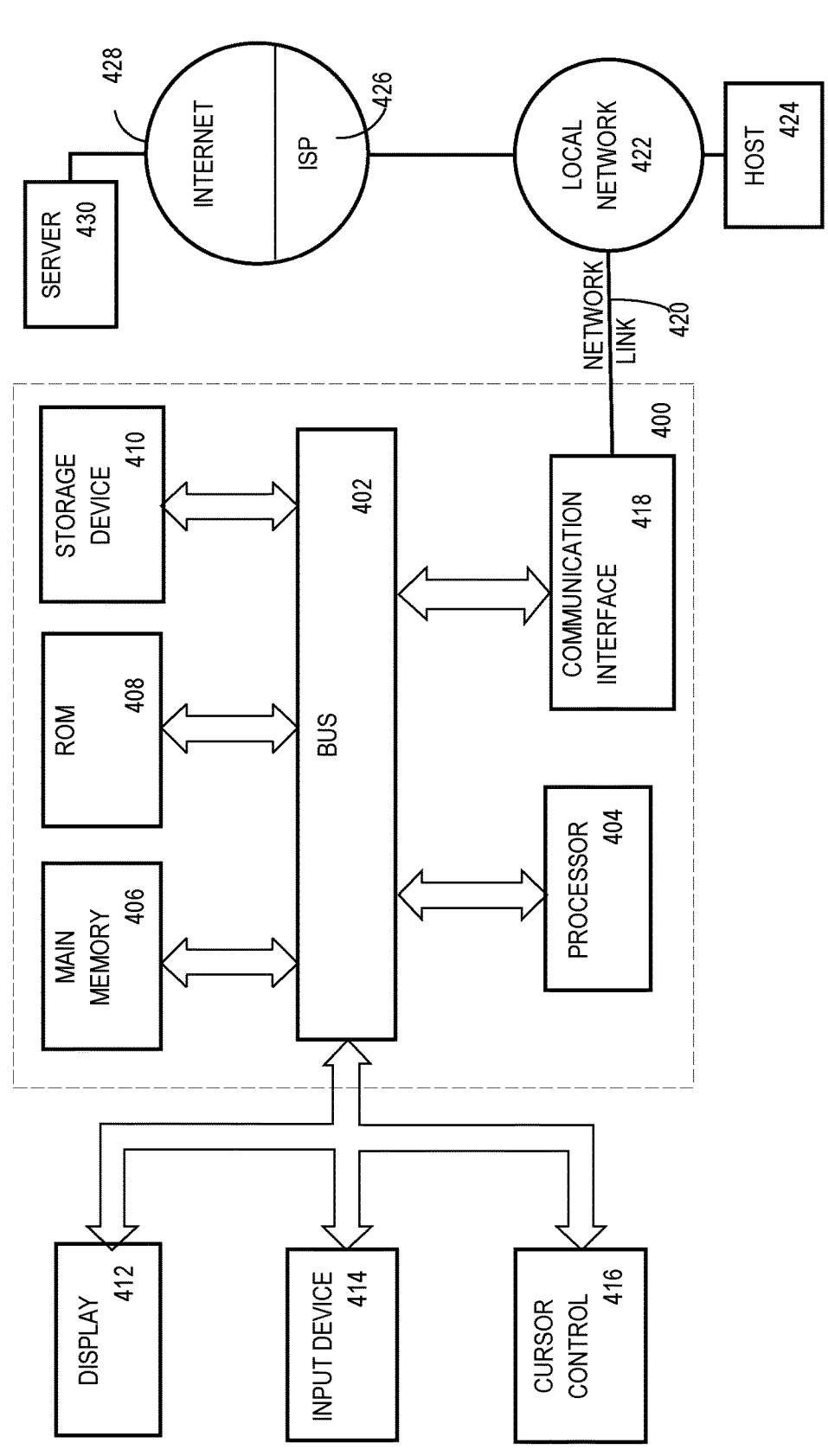
FIG. 4 is a block diagram that illustrates a computer system upon which an embodiment of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Genetic algorithms herein are improved evolutionary algorithms that implement meta-heuristics, which are heuristics for exploring a multidimensional problem space. A genetic algorithm herein models candidate parameter configurations that contain optimization variables of a complex problem as logical chromosomes that can be adjusted or combined to discover new candidate configurations. Innovations herein are based on an insight that most algorithm configuration scenarios contain common and straightforward patterns that are amendable to novel heuristics herein. The chromosome representations herein leverage those problem structure in algorithm configuration scenarios where the goal is to optimize the performance of the algorithm with respect to one or multiple competing performance objectives. Compared to single-objective algorithm configuration procedures, relatively few multi-objective algorithm procedures exist.

Other approaches use chromosome representations and genetic operators that are specialized for a particular target problem. Chromosome representations and genetic operators herein have general applicability because they are agnostic to the target problem.

Each tunable parameter is represented by a single value in a chromosome, and each chromosome represents a configuration of all parameters of a configurable target such as a machine learning (ML) model. Compensatory parameters are a pair of parameters that should be negatively correlated, such as temperature and time for cake baking. A state of the art crossover operator does not respect the negative correlation and will generate mutant chromosomes that are worse (i.e. less fit) than their parent chromosomes.

The approach herein detects and models parameter correlations among high-quality candidate solutions (i.e. high fitness chromosomes). Principal component analysis (PCA) can be applied to the top (e.g. 25%) candidate solutions in the current generation to identify the vectors along which the variance in the candidate solutions is maximized. With this approach, the original chromosome representation is replaced with one learned using PCA that is referred to herein as a virtual chromosome. Newly generated mutant virtual chromosomes correspond to all of the principal components found using PCA. When the original chromosome representation contains compensatory parameters and crossover is performed between virtual chromosomes, the candidate offspring have better solution quality than either parent, which is counterintuitive. Running the genetic algorithm over multiple generations causes the population to evolve (i.e. improve). With each generation, the improved chromosomes are selected for repeating the PCA. Thus, principal components of PCA improve as the evolving population of chromosomes improves.

Another innovation herein is based on an insight that most algorithm configuration landscapes tend to be unimodal, which means that better configurations tend to cluster near a single global optimum. A novel mutation operator is biased toward values near the current best solutions so far. The fitness of values generated by that mutation operator improves as better solutions are discovered while the genetic algorithm runs.

Virtual chromosomes encode principal components of the PCA. Because all of the principal components are perpendicular as discussed herein, there are only minimal interactions (i.e. correlations) between principal components. In other words, using principal components instead of natural parameters achieves orthogonality (i.e. decoupling) of the optimization variables. Hence, the optimization variables can be made more or less truly independent.

The primary advantage of this approach is an inexpensive and straightforward way for a genetic optimization algorithm to learn a new representation for configuration parameters that are being optimized, thereby making the optimization problem one with only weak interactions between virtual chromosomes. That increases the efficiency of the genetic algorithm, which means that a threshold solution fitness can be achieved in less time or a higher fitness can be achieved in a fixed time. Thus, the genetic algorithm is accelerated. If the optimized parameters are hyperparameters of an ML model and the fitness metric is ML model accuracy (e.g. validation score), then increased efficiency of the genetic algorithm also increases training accuracy.

In an embodiment, a computer generates many original chromosomes. Each original chromosome contains a sequence of original values. Each position in the sequences in the original chromosomes corresponds to only one respective distinct parameter in a set of parameters to be optimized. Based on the original chromosomes, many virtual chromosomes are generated. Each virtual chromosome contains a sequence of numeric values. Positions in the sequences in the virtual chromosomes do not correspond to only one respective distinct parameter in the set of parameters to be optimized. Based on the virtual chromosomes, many new chromosomes are generated. Each new chromosome contains a sequence of values. Each position in the sequences in the new chromosomes corresponds to only one respective distinct parameter in the set of parameters to be optimized. The computer or another computer may be configured based on a new chromosome that has a highest fitness score.

1.0 Example Computer

FIG. 1 is a block diagram that depicts an example computer 100, in an embodiment. Computer 100 optimizes configuration parameters A-C of any control system, such as machine learning (ML) model 110. Parameters A-C may be hyperparameters of ML model 110. For example if ML model 110 is an artificial neural network: parameter A may be a count of neural layers; parameter B may be a count of neurons in each layer; and parameter C may be a set of mutually exclusive neuron activation functions. In that case, parameters A-B are numeric, and parameter C is categorical, which may be numerically encoded such as by assigning a respective distinct ordinal of an integer sequence to each distinct activation function.

Each of parameters A-C is a dimension (i.e. axis) in a multidimensional configuration space. Each point in that multidimensional space is a possible configuration that contains a distinct combination of three values respectively of parameters A-C. Because parameters A-C may be continuous, such as floating point numbers, the multidimensional space may contain an almost unlimited count of points (i.e. possible configurations). In that case, it may be intractable to find a best point, such as a highest validation score of ML model 110 after using each point for a separate training of ML model 110.

1.1 Configuration Chromosomes

Herein, a point in the multidimensional configuration space is referred to as a chromosome, which is a tuple that contains values respectively for parameters A-C. In an embodiment, a chromosome may be stored as an array (a.k.a. vector) of respective values. For example, original chromosomes 121 contains chromosomes OC1-OC5, including chromosome OC2 that is a triplet of values A2, B2, and C2 respectively for parameters A-C.

Original chromosomes OC1-OC5 may be randomly generated, generated by grid search, or may be preexisting, such as propagated as survivors of a previous generation (i.e. iteration) of a repetitive genetic algorithm. In each iteration, the state of the art applies genetic operators to original chromosomes OC1-OC5 to generate a next generation of chromosomes, which may replace original chromosomes 121 for a next iteration.

Herein an original chromosome is a kind of logical chromosome that directly represents a configuration by containing respective values of parameters A-C. This kind of chromosome is referred to herein as a parameter chromosome, a configuration chromosome, or a chromosome in configuration space. Depending on the context herein, an original chromosome is a configuration chromosome: a) as input to a first iteration of the genetic algorithm, or b) a configuration chromosome in any generation.

1.2 Fitness Score

Each generation has its own population of chromosomes. A previous generation and a next generation may have respective populations that partially overlap (i.e. have some chromosomes in common). In each iteration, a respective fitness score is measured for each chromosome in the current generation. For example, 0.3 is the fitness score of chromosome OC5, which may be a validation score of ML model 110 after using chromosome OC5 for configuring and training ML model 110. The population of a generation may be ranked (i.e. sorted by fitness score).

Exactly how computer 100 selects a best chromosome depends on the embodiment. For example, computer 100 may select which chromosome in the last generation in the entire sequence of generations has the highest fitness score.

1.3 Generations

The population of the next generation is generated by applying genetic operators to the population of the previous generation. Elitism is a genetic operator that can be used to select a fixed count or percentage of the best chromosomes of the previous generation and then clones (i.e. directly copies) them unchanged into the next generation. So long as elitism selects at least the best one chromosome from the previous generation, the best chromosome of all generations is guaranteed to survive into the last generation of the sequence, no matter which generation was that overall best chromosome generated in.

Because elitism does not copy all chromosomes of the previous population, maintaining a constant population count in all generations requires each generation should generate new chromosomes that are mutants (i.e. not direct copies from the previous generation). Thus, each generation is a mix of old chromosomes and new chromosomes. The new chromosomes provide exploration of the configuration space. Being statistically better than a random chromosome, the old chromosomes bias the exploration toward increased fitness. Some novel fitness biases are discussed later herein.

Generations may sequentially occur to optimize until parameters A-C converge on a best chromosome that represents a best configuration point. Iterative generations may stop when any of the following criteria occur: a fixed count of generations, a fixed temporal duration, a desired fitness score, a fixed count of generations since the best chromosome so far was generated, or an increase of best so far fitness between adjacent sets of generations (e.g. ten generations) falling below a threshold.

1.4 Principal Component Analysis (PCA)

A state of the art mutation operator randomly generates new value(s) to replace one or some of parameters A-C in a new mutant chromosome that is an imperfect copy of an old chromosome. Herein, a mutation operator may have a novel fitness bias by using principal component analysis (PCA) to generate better parameter values due to a bias toward proven values.

Herein, PCA entails generating a sequence of principal components D-F, each of which is an eigenvector. There are as many eigenvectors (i.e. principal components D-F) as parameters A-C, which is three in this example. All of those three eigenvectors are perpendicular to each other. Thus, any pair of two of those eigenvectors are always perpendicular. If values of each individual parameter are unit normalized (i.e. value range of zero to one), then all of those eigenvectors intersect at a same unit normalized origin (i.e. 0.5,0.5, 0.5 as a triple) of the multidimensional configuration space.

Eigenvectors are sequentially generated. The first eigenvector is the line oriented in the multidimensional configuration space that maximizes the variance of the respective projections of chromosomes OC1-OC5 onto the line. With one of three eigenvectors generated, the next eigenvector is whichever line is perpendicular to the first eigenvector with a highest projection variance. Each next eigenvector should be perpendicular to all previous eigenvectors, which means that all three eigenvectors have very different respective orientations in the same multidimensional configuration space. PCA is taught in "Principal Component Analysis" published in 1987 by Svante Wold et al in Chemometrics and Intelligent Laboratory Systems, volume 2, numbers 1-3 that is incorporated by reference herein in its entirety.

1.5 Principal Components

In an embodiment, eigenvectors are calculated from the two dimensional covariance matrix that measures the respective variance of exhaustively combinatoric pairs of any two parameters. For example, parameter pair A-B and pair B-C are two pairs that have respective statistical variances based on values in original chromosomes 121.

Herein, the count of principal components D-F generated is set to match the count of parameters A-C, which is three. Five chromosomes OC1-OC5 can be projected onto five respective points on any eigenvector, including the three eigenvectors that are generated as principal components D-F. A benefit of unit normalization of values in original chromosomes 121 is that coordinate values of points along any of the three eigenvectors have the same unit value range as the outer bounds of the multidimensional configuration space. Principle component projection is taught in the Wold reference cited earlier herein.

That means parameters A-C each has a range of zero to one, and the principal components also have the same unit range of zero to one, even though there is not a one-to-one association between parameters A-C with principal components D-F. For example, principal component D cannot be derived exclusively from only one of parameters A-C.

In particular, each one of parameters A-C individually contributes respective distinct amounts to each of principal components D-F. Likewise, each one of principal components D-F individually combines respective distinct contributions from each of parameters A-C. In other words, each of principal components D-F is individually based on all of parameters A-C, and each of parameters A-C individually contributes to all of principal components D-F.

1.6 Virtual Chromosome

In that way, any point in the configuration space whose dimensions are parameters A-C can be projected onto a point in a PCA space whose dimensions (i.e. axes) instead are principal components D-F. Some or all of original chromosomes 121 may be projected into the same PCA space. For example, original chromosome OC2 may be projected as virtual chromosome VC1 in virtual chromosomes 122 in the PCA space. In a preferred embodiment, all chromosomes of the previous generation in the configuration space are projected to generate respective virtual chromosomes in the PCA space for sampling purposes discussed later herein.

However, not all of those projected virtual chromosomes are propagated into the next generation (i.e. virtual chromosomes 122) in the PCA space. Thus the PCA space may effectively be treated as two PCA spaces, where one PCA space is a sampling space (not shown) that reflects the previous generation and the other PCA space is actively being populated as a next generation (i.e. virtual chromosomes 122).

Herein, a virtual chromosome contains a same count of principal components as a count of parameters in a configuration chromosome. Herein, a virtual chromosome is referred to as a PCA chromosome, a chromosome in PCA space or, in some contexts, a chromosome in a sampling PCA space. Herein, the two kinds of logical chromosomes are configuration chromosomes and virtual chromosomes.

1.7 Genetic Operator

Herein, the genetic algorithm operates in the PCA space instead of the original configuration space. That is, the genetic operators are not used to sample input from the configuration space and are not used to generate new points in the configuration space. Instead, the genetic operators are used to input and output to and from the PCA space to generate virtual chromosomes 122 in the PCA space. In an embodiment, the same legacy genetic operators that were designed for use with the configuration space are instead used with the PCA space.

The elitism operator can be used to clone chromosomes from the previous generation in the PCA space into the next generation (i.e. virtual chromosomes 122) in the PCA space. For example, original chromosome OC4 is projected into the PCA space of the previous generation and then cloned as virtual chromosome VC2 into the next generation in the PCA space.

Some previous virtual chromosomes are not cloned, which means that other genetic operators (e.g. mutation and crossover) are used to generate mutant virtual chromosomes as replacements to maintain a constant population of virtual chromosomes across generations. For example, the mutation operator generates virtual chromosome VC3 as an imperfect copy of a virtual chromosome that was projected from previous chromosome OC3.

As another example of replacement by mutant generation, the crossover operator selects and clones two virtual chromosomes and swaps their respective values of a same principal component. For example, the crossover operator may select virtual chromosomes that are respective projections into PCA space of previous chromosomes OC1 and OC4 and swap respective values of principle component E in the clones.

In an embodiment, none of the genetic operators reorder values. For example, a value of principal component E in shown position 2 will never be shifted or swapped into position 1 or 3 shown for principal component D or F.

1.8 Mutant Chromosomes

A mutant virtual chromosome in virtual chromosomes 122 may have one or more principal components mutated or one or more principal components crossed over. Even if legacy genetic operators are repurposed unchanged from the configuration space to the PCA space, the accuracy of the genetic operators is increased because each of principal components D-F leverages interactions (i.e. correlations) between parameters A-C. In other words, the PCA space may be a more efficient (i.e. more accurate) multidimensional space for genetic operators to process, which is innovative.

Accuracy is further increased by biasing each kind of genetic operator in its own special way. Any kind of genetic operator (elitism, mutation, or crossover) may have a chromosome selection bias to achieve fitness bias for increased accuracy. Chromosome selection bias means that a genetic operator is twice as likely to select, from the sampling PCA space that represents the previous generation, an old virtual chromosome that is the projection of an old chromosome in the configuration space whose fitness score is twice that of another old chromosome in the configuration space. In other words, the selection bias is proportional to the fitness score, which favors proven values of parameters A-C.

A novel way to generate better mutant chromosomes in the next generation in the PCA space is to generate better random values for principal components D-F. This entails treating each of principal components D-F as a normal distribution of values that is not based solely on the unit normal range, which is static and independent of any generation, nor based on the full population of the sampling PCA space that represents the entirety of the previous generation.

Instead, the respective normal distribution of a principal component is based on the statistical mean and the statistical variance of the values projected onto that principal component by the virtual chromosomes in the sampling PCA space that are projections of a threshold count or percentage of the chromosomes in the previous generation in the configuration space that have higher fitness scores. Thus, the normal distribution is biased towards proven better values. Even though the same better virtual chromosomes are used in a same generation to define the respective normal distribution of each of principal components D-F, the respective distributions for the principal components are different because they have different respective projections and thus different respective mean and variance.

Identification of those better chromosomes for normal distribution definition occurs separately for each generation. Thus, each generation may have: its own set of better chromosomes, and its own mean and variance and normal distribution for each principal component. In other words, the normal distributions evolve as the generations evolve. Thus, random sampling (of the current normal distribution) improves with each subsequent generation, which is novel. In other words, the accuracy of the mutation operator increases across generations, which is novel.

After the next generation (i.e. virtual chromosomes 122) is fully populated in the PCA space in a current iteration of the genetic algorithm, then virtual chromosomes 122 are projected in reverse back into the configuration space, which may then replace original chromosomes 121 in a next iteration and repeating until iteration ceases due to convergence.

As discussed earlier herein: a) there is not a one-to-one association between parameters A-C with principal components D-F, and b) each of principal components D-F individually is based on all values of all parameters A-C of better chromosomes in the configuration space. Additionally, each (virtual or not) chromosome has a respective value at each of shown positions 1-3. In a chromosome that is not virtual, positions 1-3 respectively correspond to parameters A-C. In a virtual chromosome, positions 1-3 instead respectively correspond to principal components D-F.

For demonstration, position 2 is emphasized as follows. A new chromosome in the next generation in the configuration space may have a particular value in position 2 for parameter B. Due to PCA in which each principal component is based on many chromosomes in the previous generation, that particular value may be based on multiple distinct values of parameter B in multiple original chromosomes. Additionally or instead and due to PCA, that particular value may be based on multiple values of multiple parameters in multiple original chromosomes.

2.0 Example Genetic Algorithm

FIG. 2 is a flow diagram that depicts an example genetic algorithm that an embodiment of computer 100 may accelerate using PCA. FIG. 2 is discussed with reference to FIG. 1.

The genetic algorithm performs an iteration for each generation. Step 201 is preparatory and occurs only during the first iteration. Step 201 generates original chromosomes 121 in the configuration space. Step 201 may generate values for each of parameters A-C by grid search or randomly.

Step 202 measures fitness scores of the chromosomes currently in the configuration space. For example in the first iteration, step 202 measures the fitness scores of original chromosomes 121.

Step 203 detects whether or not convergence occurs, which may entail any combination of stopping criteria discussed herein. For example during the first iteration, before PCA and before any generating mutants, step 201 by itself might have accidentally generated an original chromosome that has a high enough fitness score to cause convergence. If convergence occurs, the genetic algorithm and its iterations cease.

Without convergence, the current iteration continues to steps 204-207 that perform PCA and generate mutants. Step 204 uses PCA to dynamically generate principal components from the chromosomes currently in the configuration space. Because the population of chromosomes evolves in each iteration (i.e. generation), step 204 replaces the principal components with newly generated eigenvectors in each iteration, which is a novel way to use PCA. Thus, principal component generation is dynamic and influenced by evolution, which is novel. In other words, the set of principal components evolves, which is novel. In the first iteration, fitness measurement in earlier step 202 occurs before step 204 is ever reached that generates a (i.e. ranked) sequence of principal components.

Evolving principal components has some important implications. The configuration space and the PCA space always have a same dimensionality (i.e. count of axes), which is counterintuitive because PCA is usually used in the state of the art for dimensionality reduction. Although the dimensionality of the configuration space and the PCA space always are identical, the axes (i.e. principal components) of the PCA space change (i.e. evolve) each iteration (i.e. generation), unlike the configuration space whose axes never change.

This means that representation of virtual chromosomes effectively is incrementally learned during the sequence of generations. A surprising consequence is that, unlike a state of the art genetic algorithm whose chromosome representation schema never changes, the virtual chromosome representation schema evolves. This means that a virtual chromosome should never be copied from one generation to another due to representation incompatibility, and every generation must generate its own virtual chromosomes based on its own chromosome representation schema, which is referred to herein as a learned chromosomal representation, which is a novel technique.

Step 205 projects the chromosomes currently in the configuration space into virtual chromosomes in the sampling PCA space (not shown in FIG. 1). For example in the first iteration, step 205 projects each of chromosomes OC1-OC5 onto each of principal components D-F. If this is not the first iteration, step 205 replaces (e.g. discards) whatever virtual chromosomes previously were in the sampling PCA space. Although earlier step 202 measures fitness scores of the chromosomes in the configuration space, fitness scores are never measured for virtual chromosomes (in the PCA space). If a fitness score is needed while processing a virtual chromosome, a fitness score is available because the virtual chromosome either: a) was projected from a chromosome in the configuration space that already has a fitness score, or b) will be projected in reverse back into the configuration space to generate a configuration chromosome that will have its fitness score measured.

Step 206 populates the next generation in PCA space based on: virtual chromosomes in the sampling PCA space, fitness scores of chromosomes in the configuration space, and genetic operators that function as discussed elsewhere herein. Although step 206 is the core of the genetic algorithm, step 206 is not the only innovative step in FIG. 2.

Step 207 may prepare for the next iteration. In reverse, step 207 projects the next generation (that step 206 generated) from PCA space back into the configuration space to replace (e.g. discard) the previous generation that was in the configuration space. That is, step 207 replaces the previous population in the configuration space with a better (i.e. evolved) population, which achieves an incremental optimization of parameters A-C.

Subsequent iterations may further improve (i.e. optimize) parameters A-C until convergence, which provides a best configuration for ML model 110. Due to innovations herein, convergence (e.g. achieving a desired accuracy/fitness) occurs in fewer iterations than a state of the art genetic algorithm (that lacks PCA). Thus, the genetic algorithm herein is accelerated in a novel way due to various innovations herein.

By the time the genetic algorithm finishes, computer 100 has discovered an optimal chromosome in the configuration space having a highest fitness score and containing respective values of parameters A-C that represent a best configuration that may be used to optimally configure a target system such as computer 100 or another computer, a control program or other configurable controller, a complex software application, or ML model 110 as hosted by computer 100 or other computer(s).

In an embodiment, a fitness score of a chromosome in the configuration space is measured by an objective function that measures fitness in a single dimension (i.e. a single fitness criterion such as accuracy). In an embodiment, a fitness score is based on multiple objectives (i.e. fitness criteria) that are more or less orthogonal, such as any of accuracy (e.g. validation score), inference latency, ML model size, training duration, and inference scratch space. Multiple objectives may or may not be antagonistic. For example, ML model size and inference latency are antagonistic objectives because increasing fitness of one objective is likely to decrease fitness of the other objective.

In an embodiment, multiple objectives are implemented as multiple terms (e.g. arguments) in a single objective function. In an embodiment, multiple objectives are instead implemented with separate respective objective functions whose results can be arithmetically combined to calculate a single fitness score such as by summation, averaging, or taking a maximum or minimum result of all objective functions.

3.0 Example Evolutionary Activities

FIG. 3 is a flow diagram that depicts example special activities for a genetic algorithm that an embodiment of computer 100 may perform. FIG. 3 is discussed with reference to FIG. 1. The steps of FIG. 3 may supplement the steps of FIG. 2. The steps of FIGS. 2-3 may be combined or interleaved.

In an embodiment, step 302 occurs between steps 203-204 of FIG. 2. Step 302 selects a threshold count of better chromosomes in the configuration space having highest respective fitness scores. In the first iteration of the genetic algorithm, step 302 may rank original chromosomes 121 by fitness score. In subsequent generations, step 302 instead ranks chromosomes of the previous generation in the configuration space.

In an embodiment, step 206 of FIG. 2 that populates the next generation (i.e. virtual chromosomes 122) in PCA space occurs in two stages. The first stage propagates virtual chromosome survivors of the previous generation into the next generation. The second stage generates enough mutant virtual chromosomes in the next generation to maintain a fixed population count.

In an embodiment, step 304 performs that first stage that propagates survivors. Step 304 clones virtual chromosomes from the PCA sampling space, which were projected from the better chromosomes (that step 302 selected in the configuration space) of the previous generation, into respective corresponding virtual chromosome in next generation.

Steps 306 and 308 are example novel ways of generating mutant virtual chromosomes in the next generation. Step 306 applies a novel mutation operator that generates a new value within one of principal components D-F based on a distribution that, unlike the state of the art, is not uniform.

Step 306 applies a novel mutation operator that generates a random value based on any combination of the following discussed earlier herein:

an eigenvector,
an eigenvector and a normal distribution,
multiple values in an eigenvector respectively for the better chromosomes selected by step 302 as projected onto a principal component per step 205,
a statistic of multiple values in an eigenvector,
a mean of multiple values in an eigenvector, and
a variance or standard deviation of multiple values in an eigenvector.

Step 308 applies a novel crossover operator that randomly selects two virtual chromosomes from the sampling PCA space (based on the previous generation) with a selection bias that is proportional to fitness scores of the previous generation in the configuration space. Such sampling bias is discussed earlier herein.

With or without generating a random value, a genetic operator may generate a value for a principal component that, when all principal components D-F are projected in reverse back onto the configuration space, generates value(s)

for one, some, or all of parameters A-C that never occurred in any previous generation in the configuration space.

4.0 Example Genetic Algorithm Pseudocode

The following is pseudocode of an exemplary genetic algorithm that implements some techniques discussed earlier herein. Although this pseudocode embodiment may be implemented based on embodiments of some or all of FIGS. 1-3, design choices demonstrated in this pseudocode embodiment are not necessarily constraints on other implementations of FIGS. 1-3.

This pseudocode accepts the following inputs.

The population size, N, an integer greater than 10, often in the range 30-300.

The crossover rate, R, a real number in (0, 1), often in the range 0.5-0.8.

The mutation rate, M, a real number in (0, 1), often less than 0.05.

The elitism rate, E, a real number on (0, 1), often less than 0.05.

A termination condition, in terms of the configuration budget, stagnation in objective function improvements, etc.

The percentage of the data, X, a real number in (0, 1), used to learn the chromosome representation.

A method for performing PCA.

The output of this pseudocode is the best parameters configuration evaluated so far, for a single-objective optimization problem, or the set of Pareto optimal configurations, for a multi-objective optimization problem. The pseudocode has the following sequences of steps and substeps.

1. Initialize a population, current_population, of randomly generated candidate solutions.
2. While the termination condition is not met:
   a. Evaluate the candidate solutions according to the objective function(s).
   b. Use a category encoder to learn a numerical representation for all of the categorical parameters based on all of the collected configuration performance data.
   c. Apply the category encoding transformation to the categorical parameters for all of the configurations in current_population.
   d. Fit a PCA model to the best X % of the population, keeping all of the principal components (do not discard the ones with the smallest eigenvalues, as you would normally do with PCA).
   e. Apply the PCA model to transform the entire population, current_population.
   f. Initialize an empty population, next_population.
   g. Add the best E*100 percent of current_population to next_population.
   h. While the size of next_population is less than the size of current_population:
      i. Select two solutions at random from current_population, where better solutions are chosen with higher probability.
      ii. For each chromosome in the two solutions, randomly swap the values with probability R to generate two new offspring candidate solutions.
      iii. For each chromosome in each offspring, randomly sample a new value with probability M, by sampling from a normal distribution parameterized to have a mean and standard deviation that match the values of the best X % of current_popu-
lation with respect to the selected chromosome.
   iv. Add both offspring to next_population
      i. Apply the inverse transformation of the PCA model
         to next_population.
      j. Apply the inverse transformation of the category
         encoding transformer to next_population
      k. Update current_population to be next_population.
   3. Return the best solution evaluated, or the set of Pareto-
      optimal solutions Hardware Overview According to one embodiment, the techniques described
herein are implemented by one or more special-purpose
computing devices. The special-purpose computing devices
may be hard-wired to perform the techniques, or may
include digital electronic devices such as one or more
application-specific integrated circuits (ASICs) or field pro-
grammable gate arrays (FPGAs) that are persistently pro-
grammed to perform the techniques, or may include one or
more general purpose hardware processors programmed to
perform the techniques pursuant to program instructions in
firmware, memory, other storage, or a combination. Such
special-purpose computing devices may also combine cus-
tom hard-wired logic, ASICs, or FPGAs with custom pro-
gramming to accomplish the techniques. The special-pur-
pose computing devices may be desktop computer systems,
portable computer systems, handheld devices, networking
devices or any other device that incorporates hard-wired
and/or program logic to implement the techniques.

For example, FIG. 4 is a block diagram that illustrates a
computer system 400 upon which an embodiment of the
invention may be implemented. Computer system 400
includes a bus 402 or other communication mechanism for
communicating information, and a hardware processor 404
coupled with bus 402 for processing information. Hardware
processor 404 may be, for example, a general purpose
microprocessor.

Computer system 400 also includes a main memory 406,
such as a random access memory (RAM) or other dynamic
storage device, coupled to bus 402 for storing information
and instructions to be executed by processor 404. Main
memory 406 also may be used for storing temporary vari-
ables or other intermediate information during execution of
instructions to be executed by processor 404. Such instruc-
tions, when stored in non-transitory storage media acces-
sible to processor 404, render computer system 400 into a
special-purpose machine that is customized to perform the
operations specified in the instructions.

Computer system 400 further includes a read only
memory (ROM) 408 or other static storage device coupled
to bus 402 for storing static information and instructions for
processor 404. A storage device 410, such as a magnetic
disk, optical disk, or solid-state drive is provided and
coupled to bus 402 for storing information and instructions.

Computer system 400 may be coupled via bus 402 to a
display 412, such as a cathode ray tube (CRT), for displaying
information to a computer user. An input device 414, includ-
ing alphanumeric and other keys, is coupled to bus 402 for
communicating information and command selections to
processor 404. Another type of user input device is cursor
control 416, such as a mouse, a trackball, or cursor direction
keys for communicating direction information and com-
mand selections to processor 404 and for controlling cursor
movement on display 412. This input device typically has two degrees of freedom in two axes, a first axis (e.g., x) and
a second axis (e.g., y), that allows the device to specify
positions in a plane.

Computer system 400 may implement the techniques
described herein using customized hard-wired logic, one or
more ASICs or FPGAs, firmware and/or program logic
which in combination with the computer system causes or
programs computer system 400 to be a special-purpose
machine. According to one embodiment, the techniques
herein are performed by computer system 400 in response to
processor 404 executing one or more sequences of one or
more instructions contained in main memory 406. Such
instructions may be read into main memory 406 from
another storage medium, such as storage device 410. Execu-
tion of the sequences of instructions contained in main
memory 406 causes processor 404 to perform the process
steps described herein. In alternative embodiments, hard-
wired circuitry may be used in place of or in combination
with software instructions.

The term "storage media" as used herein refers to any
non-transitory media that store data and/or instructions that
cause a machine to operate in a specific fashion. Such
storage media may comprise non-volatile media and/or
volatile media. Non-volatile media includes, for example,
optical disks, magnetic disks, or solid-state drives, such as
storage device 410. Volatile media includes dynamic
memory, such as main memory 406. Common forms of
storage media include, for example, a floppy disk, a flexible
disk, hard disk, solid-state drive, magnetic tape, or any other
magnetic data storage medium, a CD-ROM, any other
optical data storage medium, any physical medium with
patterns of holes, a RAM, a PROM, and EPROM, a FLASH-
EPROM, NVRAM, any other memory chip or cartridge.

Storage media is distinct from but may be used in con-
junction with transmission media. Transmission media par-
ticipates in transferring information between storage media.
For example, transmission media includes coaxial cables,
copper wire and fiber optics, including the wires that com-
prise bus 402. Transmission media can also take the form of
acoustic or light waves, such as those generated during
radio-wave and infra-red data communications.

Various forms of media may be involved in carrying one
or more sequences of one or more instructions to processor
404 for execution. For example, the instructions may ini-
tially be carried on a magnetic disk or solid-state drive of a
remote computer. The remote computer can load the instruc-
tions into its dynamic memory and send the instructions over
a telephone line using a modem. A modem local to computer
system 400 can receive the data on the telephone line and
use an infra-red transmitter to convert the data to an infra-red
signal. An infra-red detector can receive the data carried in
the infra-red signal and appropriate circuitry can place the
data on bus 402. Bus 402 carries the data to main memory
406, from which processor 404 retrieves and executes the
instructions. The instructions received by main memory 406
may optionally be stored on storage device 410 either before
or after execution by processor 404.

Computer system 400 also includes a communication
interface 418 coupled to bus 402. Communication interface
418 provides a two-way data communication coupling to a
network link 420 that is connected to a local network 422.
For example, communication interface 418 may be an
integrated services digital network (ISDN) card, cable
modem, satellite modem, or a modem to provide a data
communication connection to a corresponding type of tele-
phone line. As another example, communication interface
418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
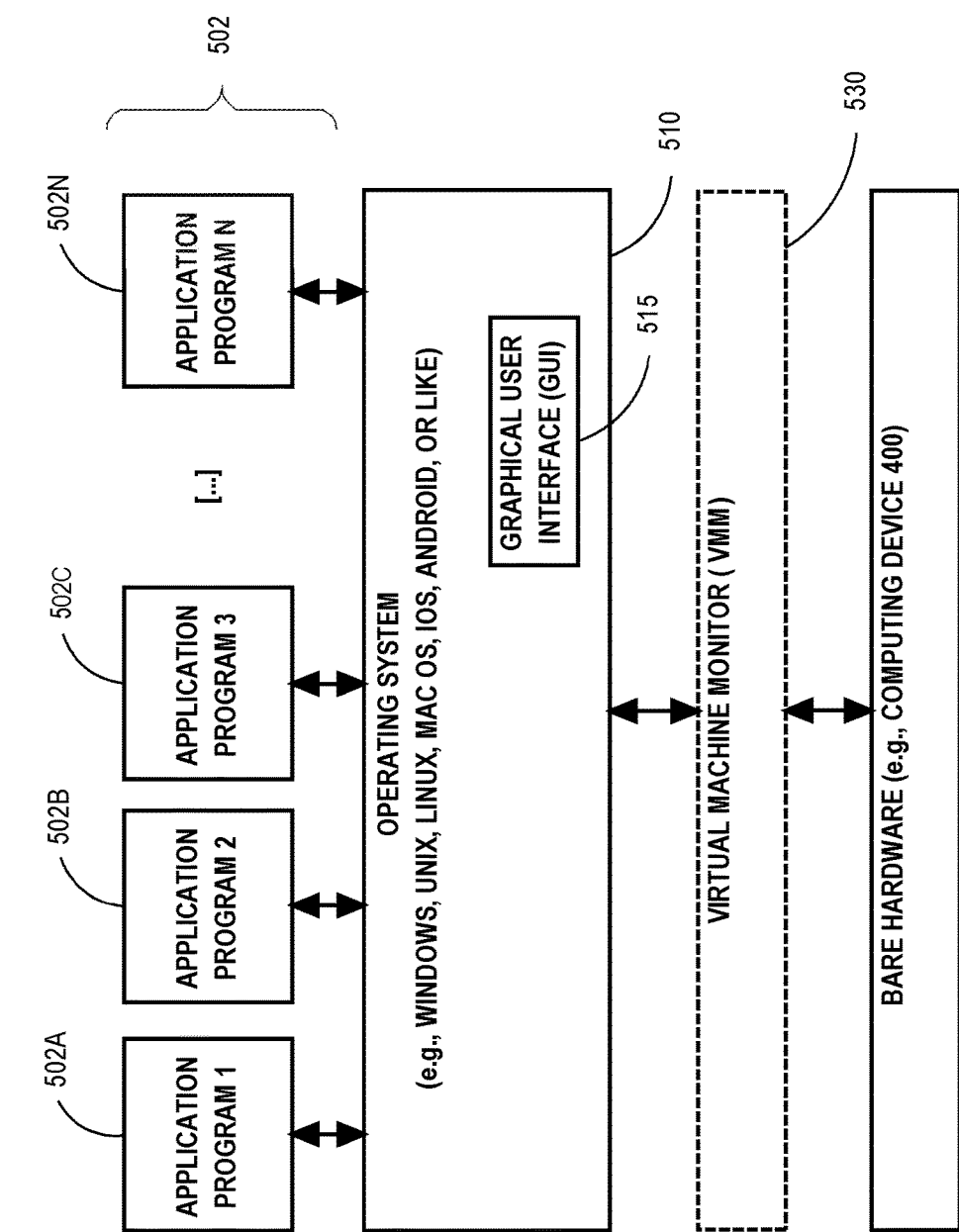
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

generating a plurality of original chromosomes, wherein:
  each original chromosome of the plurality of original chromosomes contains a sequence of original values, and
  each position in the sequences of the plurality of original chromosomes corresponds to only one respective distinct hyperparameter of a plurality of hyperparameters for a machine learning (ML) model;

generating, based on the plurality of original chromosomes, a plurality of virtual chromosomes, wherein:
  each virtual chromosome of the plurality of virtual chromosomes contains a sequence of numeric values, and
  positions in the sequences of the plurality of virtual chromosomes do not correspond to only one respective distinct hyperparameter of the plurality of hyperparameters;

generating, based on the plurality of virtual chromosomes, a plurality of new chromosomes, wherein:

each new chromosome of the plurality of new chromosomes contains a sequence of values, and each position in the sequences of the plurality of new chromosomes corresponds to only one respective distinct parameter of said plurality of hyperparameters;

generating, for each new chromosome of the plurality of new chromosomes, a respective performance measurement for the ML model, including training the ML model, including configuring said plurality of hyperparameters for the ML model based on the new chromosome, wherein said performance measurement is based on at least one selected from a group consisting of: model accuracy, training duration, inference latency, and model size; and configuring, based on a new chromosome of the plurality of new chromosomes that provided a best performance measurement, said plurality of hyperparameters for the ML model;

wherein the method is performed by one or more computers.

2. The method of claim 1 wherein at least one selected from the group consisting of:

said best performance measurement is based on a validation score of the ML model, and said best performance measurement is based on multiple objectives.

3. The method of claim 1 wherein:

the method further comprises selecting a threshold count of the plurality of original chromosomes having best performance measurements;

each position in the sequences of the plurality of virtual chromosomes corresponds to only one respective distinct perpendicular line of a plurality of lines that are perpendicular to each other;

the plurality of lines that are perpendicular are based on only said plurality of original chromosomes having best performance measurements.

4. The method of claim 1 wherein said generating the plurality of virtual chromosomes is based on at least one selected from the group consisting of:

a statistical mean, a statistical variance, a standard deviation, a normal distribution, an eigenvector, and a principal component analysis (PCA).

5. The method of claim 1 wherein said generating the plurality of virtual chromosomes comprises projecting the plurality of original chromosomes onto principal components of a PCA.

6. The method of claim 1 without at least one selected from the group consisting of:

a ranking of principle components of a PCA before generating a performance measurement, performance measurements of the plurality of virtual chromosomes, and a genetic operator that reorders values.

7. The method of claim 1 wherein:

the sequence of values of a new chromosome of the plurality of new chromosomes contains at least one selected from the group consisting of:

a particular value that is not a value randomly sampled from a uniform distribution, and a particular value that is not random;

the sequences of values of the plurality of original chromosomes does not contain the particular value.

8. The method of claim 1 wherein said generating the plurality of virtual chromosomes comprises applying a mutation operator that generates a random value based on at least one selected from the group consisting of:

an eigenvector, an eigenvector and a normal distribution, multiple values in an eigenvector, a statistic of multiple values in an eigenvector, a mean of multiple values in an eigenvector, and a variance or standard deviation of multiple values in an eigenvector.

9. The method of claim 1 wherein:

the method further comprises for each original chromosome of the plurality of original chromosomes, generating a respective performance measurement;

said generating the plurality of virtual chromosomes comprises cloning each original chromosome of a subset of the plurality of original chromosomes into a respective corresponding virtual chromosome in a next generation;

the method further comprises applying a crossover operator that randomly selects two virtual chromosomes from the plurality of virtual chromosomes with a selection bias that is proportional to the performance measurements of the corresponding original chromosomes.

10. The method of claim 1 wherein at a particular position in the sequence of values of a new chromosome of the plurality of new chromosomes is a particular value that is based on at least one selected from the group consisting of:

multiple distinct values at the particular position in the sequences of values of multiple original chromosomes of the plurality of original chromosomes, and multiple values at multiple positions in the sequences of values of multiple original chromosomes of the plurality of original chromosomes.

11. One or more non-transitory computer-readable media storing instructions that, when executed by one or more processors, cause:

generating a plurality of original chromosomes, wherein:

each original chromosome of the plurality of original chromosomes contains a sequence of original values, and each position in the sequences of the plurality of original chromosomes corresponds to only one respective distinct hyperparameter of a plurality of hyperparameters for a machine learning (ML) model;

generating, based on the plurality of original chromosomes, a plurality of virtual chromosomes, wherein:

each virtual chromosome of the plurality of virtual chromosomes contains a sequence of numeric values, and positions in the sequences of the plurality of virtual chromosomes do not correspond to only one respective distinct hyperparameter of the plurality of hyperparameters;

generating, based on the plurality of virtual chromosomes, a plurality of new chromosomes, wherein:

each new chromosome of the plurality of new chromosomes contains a sequence of values, and each position in the sequences of the plurality of new chromosomes corresponds to only one respective distinct parameter of said plurality of hyperparameters;

generating, for each new chromosome of the plurality of new chromosomes, a respective performance measurement for the ML model, including training the ML model, including configuring said plurality of hyperparameters for the ML model based on the new chromosome, wherein said performance measurement is based on at least one selected from a group consisting of: model accuracy, training duration, inference latency, and model size; and configuring, based on a new chromosome of the plurality of new chromosomes that provided a best performance measurement, said plurality of hyperparameters for the ML model.

12. The one or more non-transitory computer-readable media of claim 11 wherein at least one selected from the group consisting of:

said best performance measurement is based on a validation score of the ML model, and said best performance measurement is based on multiple objectives.

13. The one or more non-transitory computer-readable media of claim 11 wherein:

the instructions further cause selecting a threshold count of the plurality of original chromosomes having best performance measurements;

each position in the sequences of the plurality of virtual chromosomes corresponds to only one respective distinct perpendicular line of a plurality of lines that are perpendicular to each other;

the plurality of lines that are perpendicular are based on only said plurality of original chromosomes having best performance measurements.

14. The one or more non-transitory computer-readable media of claim 11 wherein said generating the plurality of virtual chromosomes comprises projecting the plurality of original chromosomes onto principal components of a PCA.

15. The one or more non-transitory computer-readable media of claim 11 without at least one selected from the group consisting of:

a ranking of principle components of a PCA before generating a performance measurement, performance measurements of the plurality of virtual chromosomes, and a genetic operator that reorders values.

16. The one or more non-transitory computer-readable media of claim 11 wherein:

the sequence of values of a new chromosome of the plurality of new chromosomes contains at least one selected from the group consisting of:

a particular value that is not a value randomly sampled from a uniform distribution, and a particular value that is not random;

the sequences of values of the plurality of original chromosomes does not contain the particular value.

17. The one or more non-transitory computer-readable media of claim 11 wherein said generating the plurality of virtual chromosomes comprises applying a mutation operator that generates a random value based on at least one selected from the group consisting of:

an eigenvector, an eigenvector and a normal distribution, multiple values in an eigenvector, a statistic of multiple values in an eigenvector, a mean of multiple values in an eigenvector, and a variance or standard deviation of multiple values in an eigenvector.

18. The one or more non-transitory computer-readable media of claim 11 wherein:

the instructions further cause for each original chromosome of the plurality of original chromosomes, generating a respective performance measurement;

said generating the plurality of virtual chromosomes comprises cloning each original chromosome of a subset of the plurality of original chromosomes into a respective corresponding virtual chromosome in a next generation;

the instructions further cause applying a crossover operator that randomly selects two virtual chromosomes from the plurality of virtual chromosomes with a selection bias that is proportional to the performance measurements of the corresponding original chromosomes.

19. The one or more non-transitory computer-readable media of claim 11 wherein said generating the plurality of virtual chromosomes is based on at least one selected from the group consisting of:

a statistical mean, a statistical variance, a standard deviation, a normal distribution, an eigenvector, and a principal component analysis (PCA).

* * * * *